(12) United States Patent
Chan

(10) Patent No.: US 6,839,699 B2
(45) Date of Patent: Jan. 4, 2005

(54) NATURAL QUERY INTERFACE BASED ON CONCEPT SELECTION

(76) Inventor: Wayne Chan, 19300 Skyline Blvd., Los Gatos, CA (US) 95033

( * ) Notice: Subject to any disclaimer, the term of this patent is extended or adjusted under 35 U.S.C. 154(b) by 581 days.

(21) Appl. No.: 09/976,440

(22) Filed: Oct. 12, 2001

(65) Prior Publication Data

US 2002/0135567 A1 Sep. 26, 2002

Related U.S. Application Data

(60) Provisional application No. 60/286,259, filed on Apr. 24, 2001, and provisional application No. 60/254,298, filed on Dec. 8, 2000.

(51) Int. Cl.[7] .......................... G06F 17/00; G06F 17/30
(52) U.S. Cl. ............................................. 706/45; 707/5
(58) Field of Search ................................. 706/45; 707/5

(56) References Cited

U.S. PATENT DOCUMENTS

| | | | |
|---|---|---|---|
| 5,787,417 A | 7/1998 | Hargrove | 707/4 |
| 5,940,821 A | 8/1999 | Wical | 707/3 |
| 6,078,326 A | 6/2000 | Kilmer et al. | 345/834 |
| 6,460,034 B1 * | 10/2002 | Wical | 707/5 |

FOREIGN PATENT DOCUMENTS

| | | |
|---|---|---|
| WO | WO 00/36529 | 6/2000 |
| WO | WO 00/57257 | 9/2000 |

* cited by examiner

*Primary Examiner*—George B. Davis
(74) *Attorney, Agent, or Firm*—Beyer Weaver & Thomas LLP

(57) ABSTRACT

A computer-aided method and apparatus to access information is disclosed. According to one embodiment, the apparatus includes a selector, a mapper and a generator. Through the selector, a person can select concepts and/or elements in the concepts. The mapper maps the selected concepts and elements to an inquiry. Then, the generator generates a response to the inquiry. The response can remain the same, independent of the order of the concepts selected by the person.

62 Claims, 13 Drawing Sheets

GROUPING OF CONCEPTS

```
Date    Time    City

Theater Resta   SF
                San Jose      2nd click
Traffic Stree   Shanghai
                New York
Weather         Los Gatos Stock           ...

Quantity
```

FIG. 10D

```
              point
Date    Time    City

Airline Action

Traffic Street  Food

Weather         Hotel

Restaurant      Store

Quantity        Quality
```

FIG. 10E

```
         3rd click
Date

Nov           1 2 3
   Dec  Restaur  4 5 6
   Jan           7 8 9
   Feb  Street   10 11
   Mar           12 13      4th click
   Apr           14 15
   May  t        16 17
   Jun           18 19
   Jul           20 21
   Aug           22 23
```

FIG. 10F

Date    point

*Airline*    Action

Traffic    Street    Food

Weather            Hotel

Restaurant    Store

Quantity    Quality

FIG. 10G

Date    Time    City

*Airline*    *Action*    5th click

United
Traffic    American
         Air China
Weath    JPL
         ...
Restau Quanti                    ty

FIG. 10H

NATURAL QUERY INTERFACE BASED ON CONCEPT SELECTION

CROSS-REFERENCE TO RELATED APPLICATIONS

This application claims the benefit of: (i) U.S. Provisional Application No. 60/254,298, filed Dec. 8, 2000, and entitled "NATURAL QUERY INTERFACE BASED ON CONCEPT SELECTION," which is hereby incorporated by reference herein; and (ii) U.S. Provisional Application No. 60/286,259, filed Apr. 24, 2001, and entitled "METHOD AND SYSTEM FOR INFORMATION RETRIEVAL BASED ON MENU SELECTIONS," which is hereby incorporated by reference herein.

BACKGROUND OF THE INVENTION

1. Field of the Invention

The present invention relates generally to a natural query interface, and more particularly to a natural query interface based on selecting concepts.

2. Description of the Related Art

The information age has lead to an environment where information access is becoming increasingly important. Various challenges result from so many people accessing information. Further exacerbating the challenges, business entities (such as corporations) typically have their information in many different formats, and different people with different skill sets access the information using different information devices. The information devices can be wired or wireless. Currently, more and more people are trying to get access to the information through wireless means. The worldwide market for information appliances is predicted to exceed 89 million units and $17.8 billion in 2004, and the shipment of Internet cell phones will reach 172 million units by 2005.

Information devices, e.g., information appliances, can access information through various different types of user interfaces. One type of user interface relies on voice recognition to receive user input. Presently, voice recognition is not mature enough for pervasive use. In addition, voice recognition approaches are not appropriate for many applications or situations. Another type of user interface relies on handwriting recognition. For example, certain personal digital assistants use handwriting as a user interface. This can be a versatile approach. However, the technologies are not so well developed as to allow one to write quickly, while still accurately recognizing the handwriting.

Still another type of user interface uses one or a series of predetermined menus that a user interacts with to make selections using a pointing mechanism or using data entry keys or buttons. For example, NTT Docomo of Japan has been quite successful with a mobile telephone that uses such a user interface. Typically, out of a user menu of a fixed number of choices, a user selects one. For example, a pull-down menu can be displayed, and the user can select one element out of the menu being displayed. Additional detailed menus can further refine the user's choice. In general, this type of user interface is inflexible and offers only a limited number of choices. For example, there may be seven top choices, each with a limited number of sub-choices. Once you pick one of the sub-choices, you may be given a direct answer. Another weakness in this type of user interface is that its menus are static and lack intelligence.

It should have been apparent from the foregoing that there is a need for an improved user interface for information appliances.

SUMMARY OF THE INVENTION

The present invention pertains to a query interface for versatile information access. In one embodiment, the query interface (also referred to as a user interface) is presented on a display screen of an information appliance. The query interface is not only more intelligent than existing techniques, but also can allow users to compose his or her own query to easily access large amounts of information. The query interface can mimic natural thought processes, is easy to use, and does not require users to go through lengthy training exercises.

One embodiment of this invention utilizes concepts. A concept can be defined as a generalization of a number of elements, or a category of related elements.

One approach includes a selector, a mapper and a generator.

As an example, consider a person who is interested in flight information from San Francisco to New York on Dec. 17, 2000. The selector shows him a list of concepts, including cities and dates. He selects one of them. This selection can be through a pointing device or other means. First, he selects the concept of city. A list of elements shows up, and in this case, they are specific cities favored by this particular user. Out of them, he selects San Francisco. Secondly, he selects the concept of city again. This time, he picks New York. Then, he selects the concept of date, and picks Dec. 17, 2000. Based on the selected concepts, the mapper, using one or more rules, maps to one or more inquiries. In this case, the inquiry can be, "When are flights departing from San Francisco to New York on Dec. 17, 2000?" The generator generates a response to the inquiry, which can be a list of flight numbers and their schedules. In general, the response remains the same independent of the order of the concepts selected by the person. For example, the response remains the same if the person picks the concept of date before the concept of cities. In the case of the two cities, the system can assume that the first one is the starting point and the second one is the destination. Alternatively, the system can also provide both choices as responses. Note that the person, in effect, composes a query without being presented a menu about travel. It is accomplished by his selection of the concepts that constitute the query. The selections are from many concepts related or unrelated to the domain of travel. Moreover, typically, if he picks more concepts, the accuracy of the responses increase. In another embodiment, the user can be notified of the inquiry mapped, and is allowed to confirm that the inquiry is correct or is the one he is interested in. In such an embodiment, the system can allow the user to make changes to the inquiry.

Typically, there is a screen with a limited number of concepts shown to the user. In one embodiment, the concepts being shown can even dynamically change as the user is selecting concepts.

For example, if there are 20 concepts for the user to select, and the user may pick five or less concepts to compose a query, there can be more than three million combinations. Each combination can be a question asked by the user. While not all these combinations can be mapped to meaningful queries, the number of potential queries can still be very large. Such a huge number of combinations have not even taken into consideration elements or pull-down menus that can be available for some or all of the concepts. This type of intelligent device thus is able to easily handle more information than the existing menu-driven handheld devices. Also, the input method is natural, without the need for extensive training. In effect, the user is able to post a question by presenting only the essential input elements of the question.

As another example, once a person picks a combination of concepts and their associated elements, the person is notified of a few pre-selected questions. They can be as follows, with each set of symbols <> denoting a pull-down menu with numerous choices under the heading of the pull-down menu:

"When are flights departing from <city> to <city> on <date>?"

"What are the <airline> flights departing from <city> to <city> on <date> ?"

"What is the lowest airfare going from <city> to <city> on <date>?"

This type of query interface is again very natural. Each output includes many combinations. For example, the number of combinations for the second question can again be in the order of millions.

The selector can be embedded in an information appliance, and can include a screen. The selector may also include a voice synthesizer to indicate to the user the response vocally.

Other aspects and advantages of the present invention will become apparent from the following detailed description, which, when taken in conjunction with the accompanying drawings, illustrates by way of example the principles of the invention.

BRIEF DESCRIPTION OF THE DRAWINGS

The invention will be readily understood by the following detailed description in conjunction with the accompanying drawings, wherein like reference numerals designate like structural elements, and in which:

FIGS. 10A, 10B, 10C, 10D, 10E, 10F, 10G, and 10H, illustrate examples of displays in the rectangular window of a hand-held device exemplifying one embodiment of the present invention.

DETAILED DESCRIPTION OF THE INVENTION

The present invention pertains to a query interface for versatile information access. In one embodiment, the query interface (also referred to as a user interface) is presented on a display screen of an information appliance. The query interface is not only more intelligent than existing techniques, but also can allow users to compose his or her own query to easily access large amounts of information. The query interface mimics natural thought processes, it is easy to use, and does not require users to go through lengthy training exercises.

Embodiments of this aspect of the invention are discussed below with reference to FIGS. 1–10H. However, those skilled in the art will readily appreciate that the detailed description given herein with respect to these figures is for explanatory purposes as the invention extends beyond these limited embodiments.

In general terms, the detailed description is separated into two portions. The first portion is on general embodiments of the present invention, and the second portion is on one specific implementation exemplifying one embodiment of the present invention.

Figure 1:
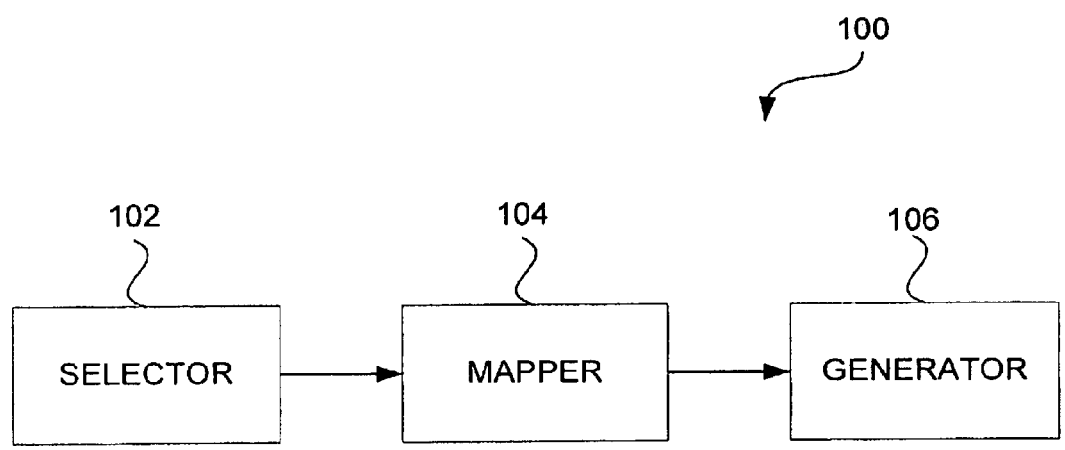
FIG. 1 illustrates one embodiment of the present invention.

FIG. 1 illustrates a block diagram of a query engine 100 according to one embodiment of the present invention. The query engine 100 includes a selector 102, a mapper 104, and a generator 106. The selector 102 allows a person to select one or more concepts from a group of concepts. A concept can be defined as a generalization of a number of elements, or a category of related elements. Based on one or more rules, the mapper 104 maps the one or more concepts selected and their selected elements, if applicable, to one or more inquiries. After the inquiry is mapped, the generator 106 generates a response to the inquiry.

Figure 2:
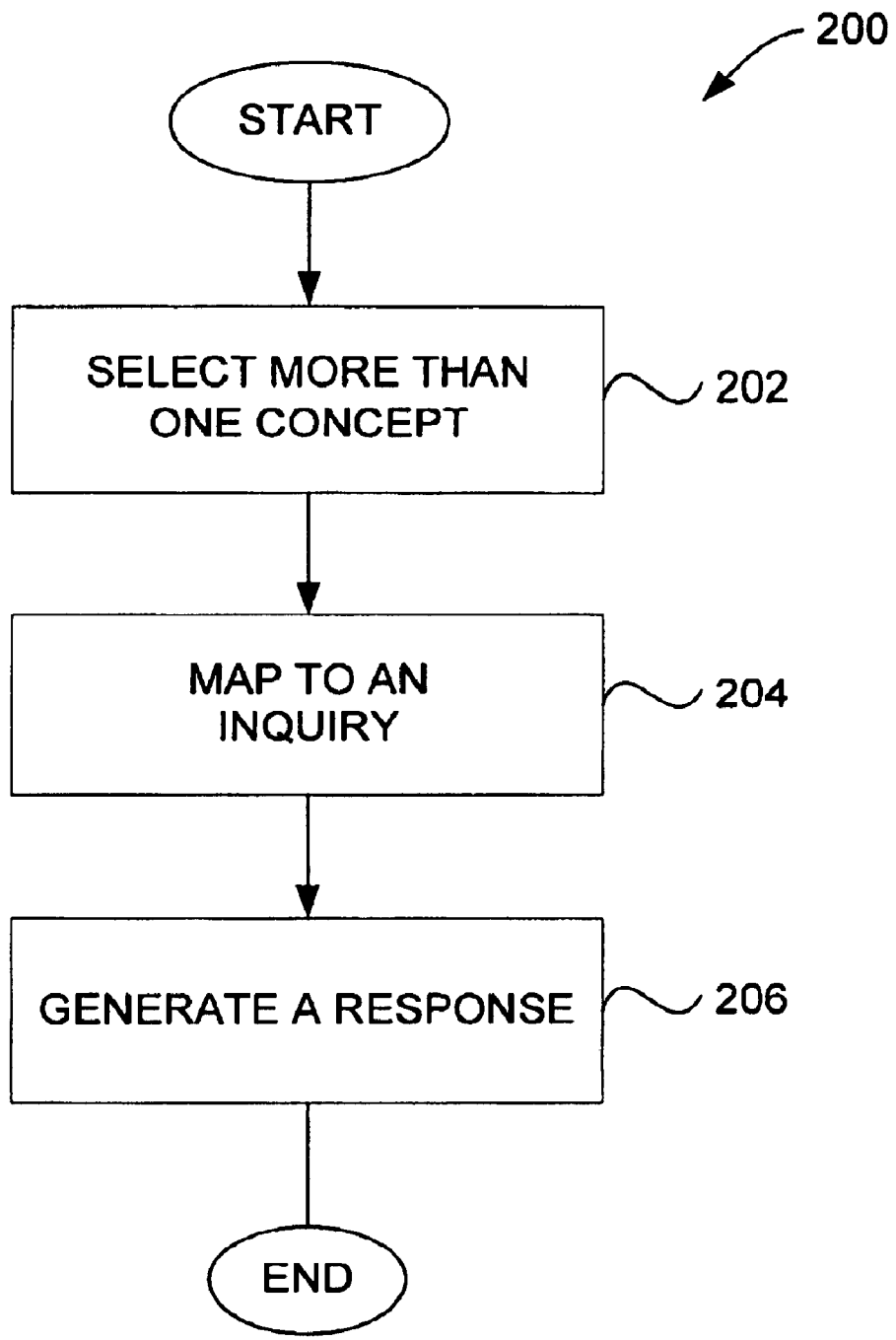
FIG. 2 illustrates one set of steps to implement one embodiment of the invention.

FIG. 2 is a flow diagram of query processing 200 according to one embodiment of the invention. The query processing 200 is, for example, performed by the query engine 100 illustrated in FIG. 1. Initially, the query processing 200 operates to select 202 two or more concepts. Typically, the available concepts to be chosen from are presented to the user as a group of concepts. After two or more of the concepts are selected 202, the two or more concepts are mapped 204 to at least one inquiry. Then, a response to the at least one inquiry is generated 206. Thereafter, the response can be presented to the user through various means. For example, the response can be presented to the user on a display screen or by way of audio output.

Note that when the user selects multiple concepts, there is a certain order to the selections. For example, one concept is selected before another concept. In one embodiment of the invention, the response generated can be the same, independent of the order of selection of at least two of the concepts by the user.

Figure 3:
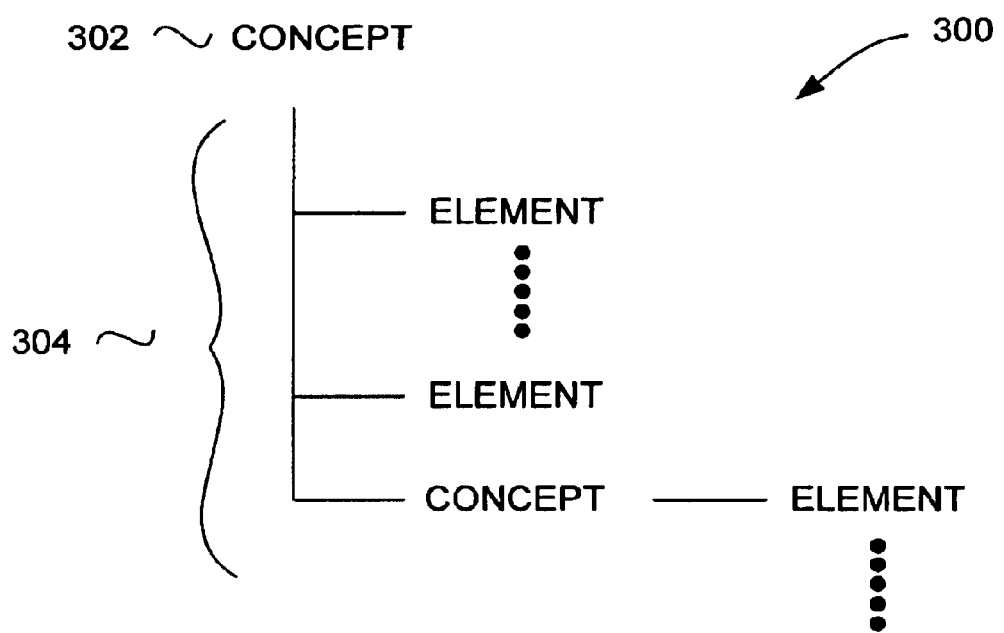
FIG. 3 shows an example of a concept and its hierarchy of elements in the present invention.

FIG. 3 shows an example of a concept format 300 according to one embodiment of the present invention. The concept format 300 includes a concept 302 and a hierarchy of elements 304. In a general sense, a concept can encapsulate a number of elements that are related to each other. For example, the concept of food can include the elements of food from different countries. Each element can itself also be a concept. For example, the concept of food from Japan can be classified into the elements of spicy and non-spicy food. In one embodiment, by clicking (or otherwise selecting) on a concept, one can be presented with a pull-down menu showing a number of elements under that concept. A concept can also be a stand-alone concept which contains no selectable elements. One can use these types of concepts to help refine a query. In one embodiment, concepts can be used to indicate abstract relationships, such as Boolean operators, and modifiers such as 'greater than,' 'equal to,' 'less than,' and 'least,' etc. The decision to use this type of abstract concept influences the ease of use, complexity and precision of the interface. If an element of a concept itself is a concept, the hierarchy of elements 304 can be a multi-level hierarchy tree.

Through use of a query interface, the user can select concepts or elements within the concepts. If the user has selected an element, in one embodiment, the inquiry mapped also depends on the element selected. Note that if a person has selected an element within a concept, the person can be considered to have selected the corresponding concept.

The objective of the selections is to allow the user to select a combination of concepts and their associated elements, if applicable. These concepts available for selection can be prescribed to a user and various techniques can be used to facilitate the selection process. For complex applications with a large number and variety of concepts, the ease of use of the interface can be improved by using various techniques.

Figure 4A:
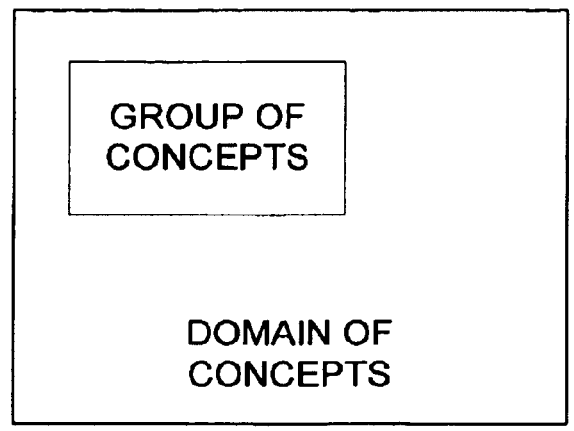
FIG. 4A shows a group of concepts embedded in a domain of concepts in the present invention.

In one embodiment, a number of concepts are grouped together and are shown to a user. Concepts can be included in a group to facilitate easy selection of concepts. For example, a group might include the concepts time, restaurant and cities. This group of concepts may be selected from a large domain of concepts, as illustrated by FIG. 4A. Out of the domain, certain concepts are identified to be included in the group.

Figure 4B:
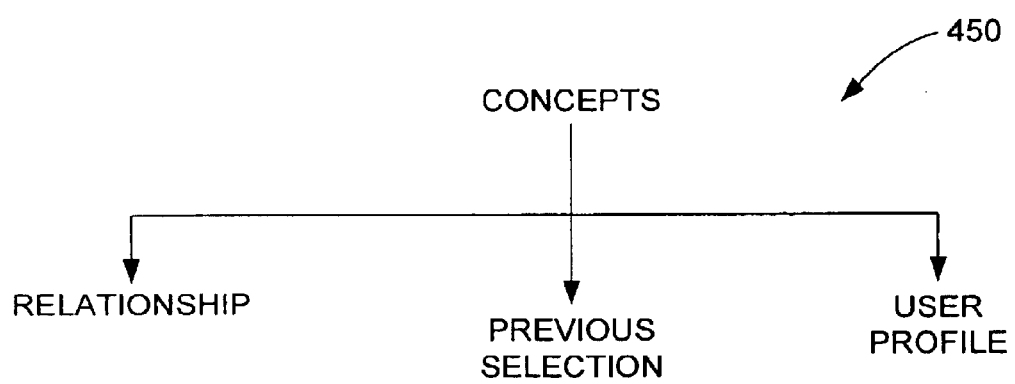
FIG. 4B shows examples of how concepts are grouped together in the present invention.

FIG. 4B shows an association 450 of how concepts can be grouped according to one embodiment of the present invention. Examples of how concepts can be grouped together to be included in the group of concepts are as follows. One of the reasons concepts are grouped together is for ease of presenting to the user. For example, in one embodiment, two concepts are grouped together based on the fact that they are related to each other, e.g., they are concepts within an application scenario, or based on the fact that the user previously selected them. In another embodiment, concepts are grouped together based on at least one characteristic of the user or based on a user profile. For example, if the user likes opera, then the concept of opera can be one of the concepts in the group of most frequently used concepts. This dependency presumes that the user profile is previously known. Also, there can be certain information automatically known about the user. For example, if the device can automatically identify its own location through a global positioning system, then it can automatically identify the location of the user.

Figure 5:
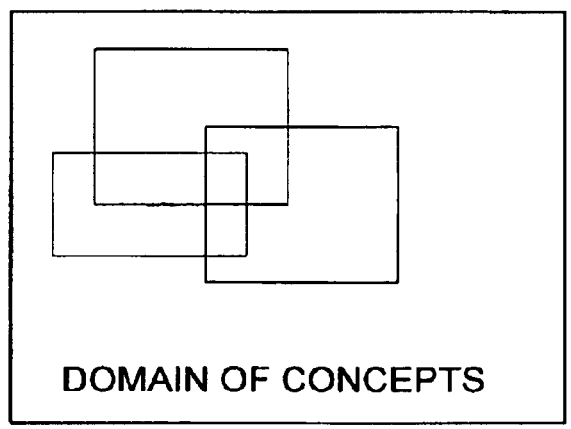
FIG. 5 shows grouping of concepts indicating concepts can belong to multiple groups.

There can be multiple groups representing multiple application scenarios. Further, as shown in FIG. 5, concepts can also belong to multiple groups. For example, there may be four groups represented with group 1 representing travel, group 2 representing city information, group 3 representing sport information and group 4 representing award information. Based on a user profile, one can initially show concepts belonging to selected groups that are most likely to be selected. One embodiment is described in an example below.

Note that concepts in a group do not have to be in the same language. For example, some concepts can be in English, and some can be in Chinese. Similarly, elements within a concept also do not have to be in the same language. Some elements can be in one language, while another element in another language.

Figure 6A:
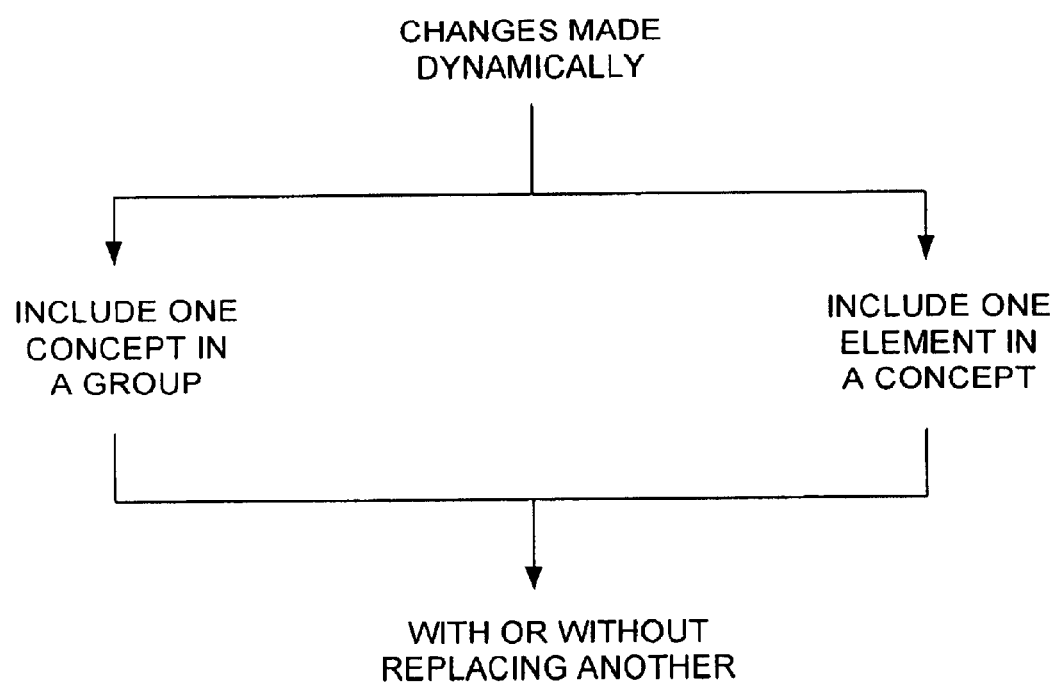
FIGS. 6A and 6B show examples of ordering of groups, concepts within each group and elements within each concept to facilitate display and easy selection for devices with limited display capability.
Figure 6B:
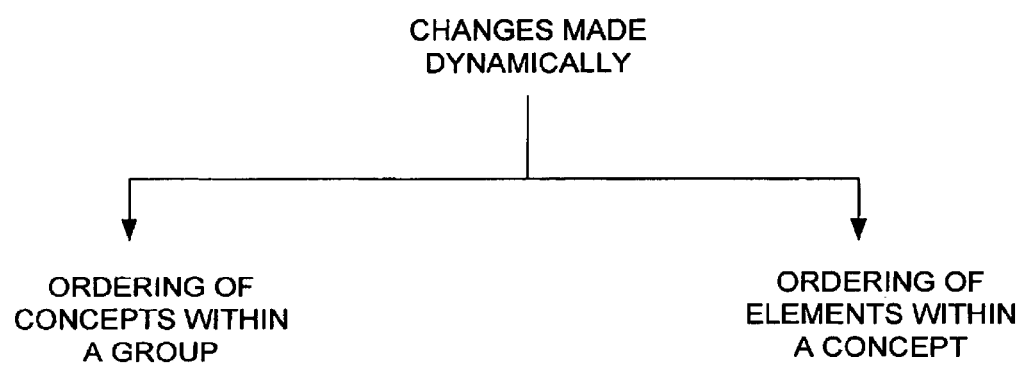

In one embodiment, the concepts grouped together and the elements in groups can change dynamically. FIGS. 6A and 6B show diagrams of how changes in groupings can be made dynamically in the present invention. In FIG. 6A, the dynamic change pertains to including a concept within a group or including an element within a concept. In FIG. 6B, the dynamic change pertains to ordering a concept within a group or ordering elements within a concept.

Ordering of groups, ordering of concepts within a group and ordering of elements within a concept can all be used to facilitate displaying concepts and elements and facilitate their easy selection. When only some of the concepts or elements can be shown, an ordering can be used to prioritize which concepts should be shown first. In one embodiment, the concepts can be ordered according to the number of groups that they belong to. For concepts belonging to the same number of groups, the concepts will be ordered in the order of the groups they belong to. If the display device has a scrolling capability, the most likely selected concepts can be placed at the top of the display list.

In one embodiment, elements can be grouped according to grouping of concepts. For example, if there is a concept City containing names and it belongs to two grouping of concepts, Travel and City information, then the city names within the concept City can be grouped into Travel and City information. The user may have favorite traveling destinations and ask for information only about San Francisco Bay Area. The knowledge of which group of concepts the user is selecting can help prioritize which cities will be displayed when a drop-down list is being shown. If the user is selecting traveling concepts, the cities of favorite destinations in the concept City can be displayed first.

In one embodiment, the ordering of groups can be changed dynamically. For example, after the user has selected the concepts of cities, it can be inferred that concepts within sport group and award group will unlikely be selected next. These groups will dynamically be assigned a lower order or priority. As a result, these concepts which belong only to these groups will not be at the top of the display list, i.e., within the initial display windows. When the concept of cities is selected twice, it can be inferred that only concepts within the travel groups are relevant. At this point, groups of city information can also be assigned a lower priority, or order, so that they will not belong to the initial display window. This concept will be illustrated in an example provided below.

In one embodiment, whether or not a concept should be included in the group can change dynamically. For example, there can be a rule such that if the person never selects a concept in the previous 100 selections, that concept should be removed from the group. Then, at the $101^{st}$ selection, concepts that have not been selected in the previous 100 selections can be automatically removed.

Similarly, a concept can be added to a group. For example, a user might prefer to add a particular concept into a group. The added concept may or may not replace another concept already in the group. The system can also dynamically add concepts to a group based on frequency of selection together with other concepts in the group.

In one embodiment, the number of inquiries that the concepts have received can be mapped or monitored to order the concepts. This is illustrated in an example below.

The objective of the selector is to facilitate the selection of a combination of concepts and their associated elements, if any. A mixture of methods can be used to achieve this. The above description focuses on using display screens to present the concepts or elements to users. However, it should be understood that selection of such concepts or elements can be from different means, such as pointing devices, voice input, or handwriting input. Use of pointing devices, voice and handwriting can be intermixed when applicable.

Figure 7:
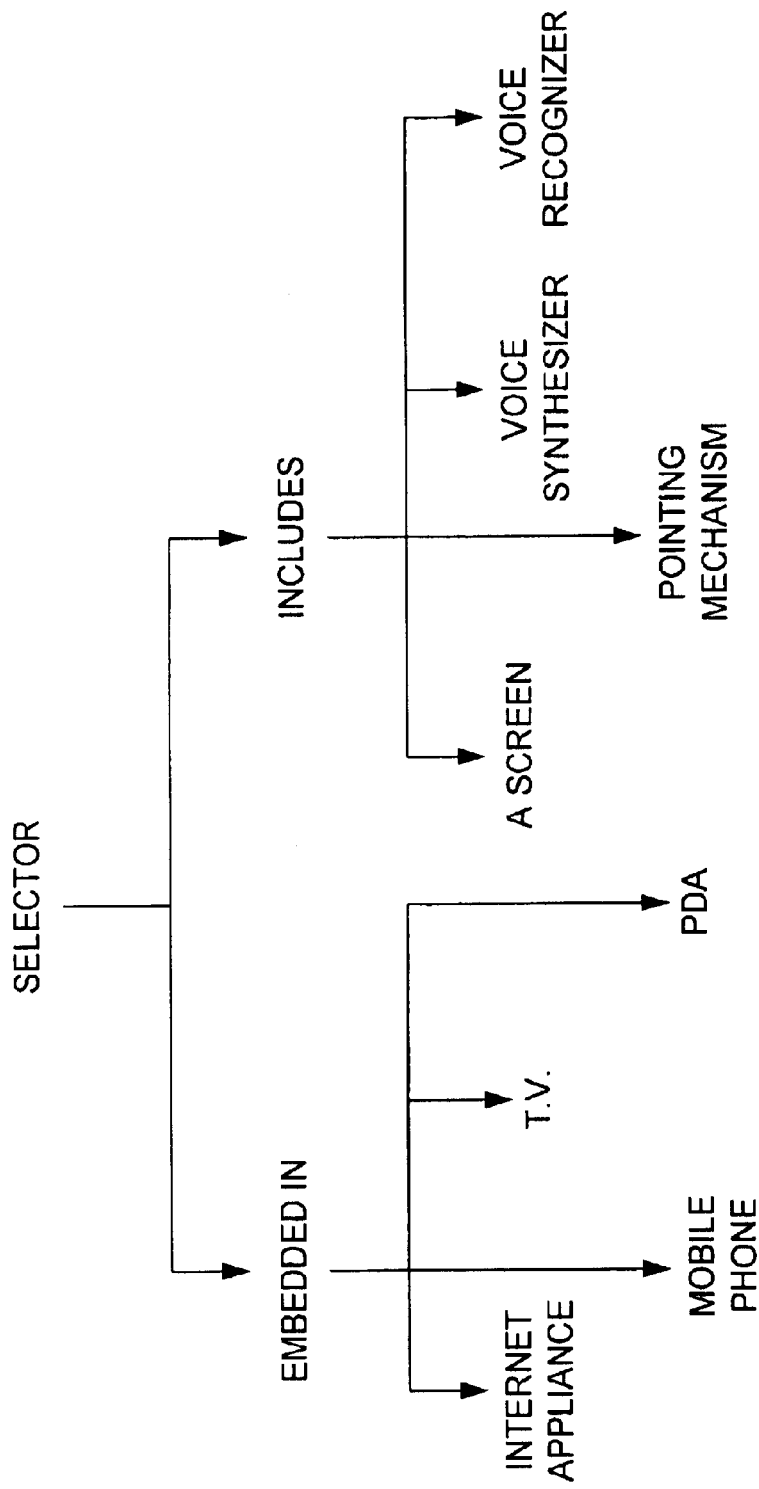
FIG. 7 shows examples of where the selector can be embedded in, and examples of what the selector can include in the present invention.

FIG. 7 shows examples of where the selector can be embedded in, and examples of what the selector can include according to embodiments of the present invention. The selector can be embedded in an Internet appliance, a mobile phone, a television, a personal digital assistant or a computer. More generally, the selector can be embedded in an information appliance. The selector may include a screen to display the group of concepts. The selector can include a pointing device or voice recognition mechanism to help the user select concepts. In other words, the user can use the pointing device to identify and select a concept, or the user may use his voice to select a concept. For example, the user may just say, "Cursor up, down, left or right." When the cursor reaches the desired concept, the user may then say, "Enter" and that concept will be selected. In yet another embodiment, the selector includes a voice synthesizer to indicate to the user the concept selected. For example, after the user has selected a concept, the selector can ask the user, "You have selected cities. Is this correct?" If the user responds affirmatively, the concept of cities will be selected.

Figure 8:
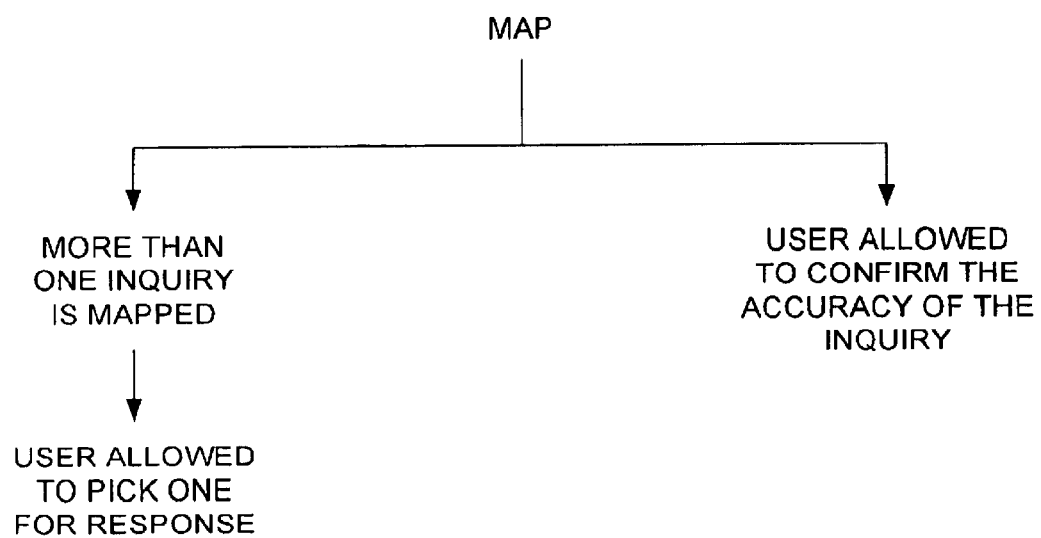
FIG. 8 shows examples of features in the mapping step in the present invention.

FIG. 8 shows examples of features in the mapping process according to one embodiment of the present invention. For example, if the one or more concepts selected by the user can be mapped to more than one inquiry, the mapper may map to the more than one inquiry. All or some of the mapped inquiries can be presented to the user. The selector again can allow the user to select one of the inquiries to be responded to. In another embodiment, the user is allowed to confirm the accuracy of the inquiry mapped. For example, after selecting the one or more concepts, the selector can vocally indicate to the user that, "You asked, 'What is the arrival time of United 101?' Is this correct?" The affirmative response from the user will confirm the accuracy of the inquiry selected. Of course, the selector can also receive confirmation in other ways, such as with a pointing device. In yet another embodiment, the inquiry mapped is not presented to the user, but is directly fed to the generator to have one or more responses produced. In this embodiment, the mapper can map directly to a response. The generator then generates the response to the user.

An inquiry mapped can include many inquiries. For example, the user selects the concepts <city>, <city> and <date> of travel group, the following inquiries may be mapped and presented to the user:

"When are flights departing from <city> to <city> on <date>?"

"What are the <airline> flights departing from <city> to <city> on <date> ?"

"What is the lowest airfare going from <city> to <city> on <date>?"

Each set of symbols < > denotes a pull-down menu with choices of other elements under the heading of the pull-down menu. The selected elements will be the default choices. The pull-down menu for city can have many cities, and the pull-down menu for date can have three hundred sixty-five days. The second query introduces a new concept <airline> which is not selected by the user. The response provides the user additional choices if he prefers. Any one of the three inquiries can be spanned out as a large number of fixed inquiries.

The mapper can also perform a certain degree of intelligent guessing. For example, after the user has selected the city, San Jose, and the concept of weather, the mapper automatically maps to the following inquiry:

Are you interested in the weather of San Jose on <date>? Where the <date> pull-down menu shows today's date.

In another example, if the user picks the stock, IBM, the mapper automatically asks the user whether he is interested in the stock price of IBM. This guesswork can be based on the user's previous habit, such as the user asking for the price of IBM stock more than twice within a seven-day period. Based on such a rule and the user's previous habit, once the user selects IBM stock, the mapper will map to the inquiry of asking for the price of IBM stock. If the user confirms the accuracy of the inquiry, the price will be quoted to the user.

Figure 9:
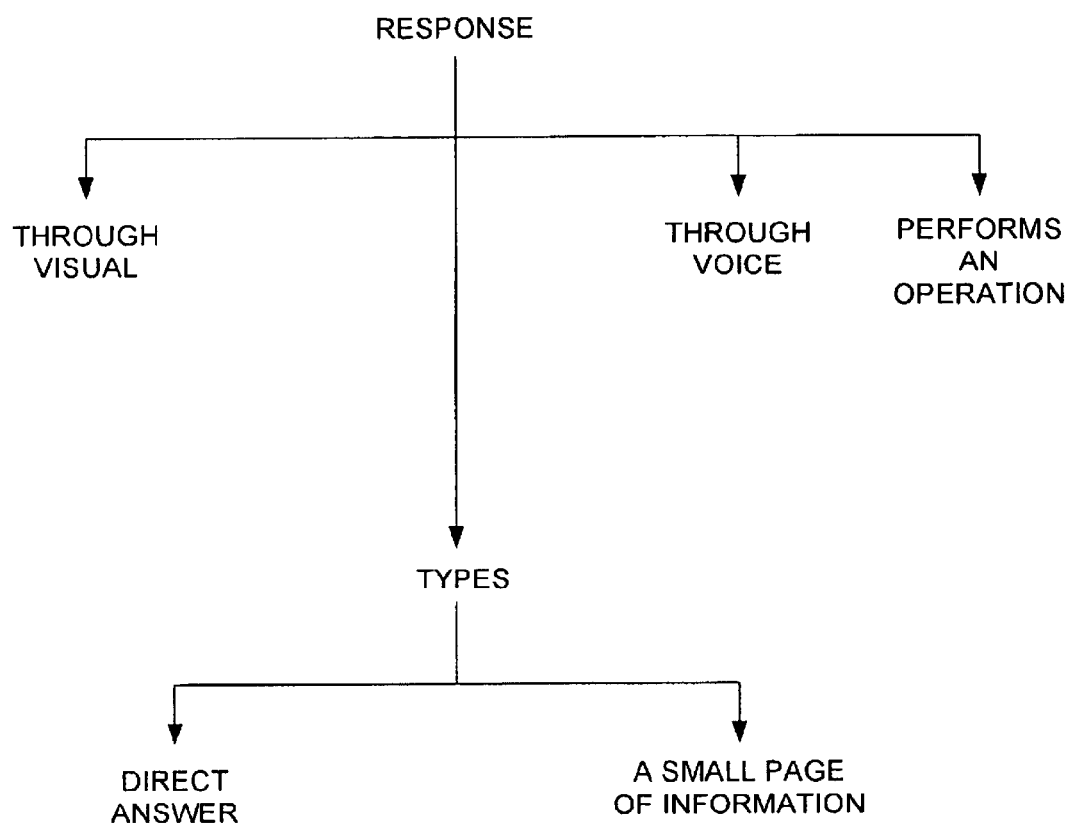
FIG. 9 shows examples of features in the response of the present invention.

FIG. 9 shows examples of features in the response. The response can be through visual effects, such as displayed on a screen. The response can additionally or alternatively be through voice output. In yet another embodiment, in view of the response, an operation is performed. For example, the selector may say, "You asked to delete the stop limit order on IBM. Is this correct?" If the user responds affirmatively, an operation will be performed leading to the stop limit order on IBM being deleted.

The responses in the present invention can be of different types. For example, the response can be a direct answer. In another example, the response can be a small page of information, with the direct answer included in that page.

In the above examples, the selector can be in one apparatus, which is wirelessly coupled to the mapper and the generator. In another embodiment, the mapper and selector are in one apparatus, which is wirelessly coupled to the generator. The coupling can also be achieved in a wired manner. The coupling (wired or wireless) can be through a network, which may include the Internet or an intranet.

There can be situations where the user has selected the wrong concepts, or the concepts selected do not make sense. Under this situation, the user may be asked to re-select one or more concepts again.

The following illustrates one specific implementation exemplifying one embodiment of the present invention. Examples of concepts or categories in a domain of a handheld device are listed below. Some of the concepts include elements in parenthesis. The example does not intend to provide complete listing of elements.

1. City (SF, San Jose, New York, Shanghai, Palo Alto, Los Gatos, . . . )
2. Date (Year, Month, Day)
3. Time (1 am, 2 am, . . . , 1 pm)
4. Restaurant (Chinese, French, Italian, . . . )
5. Hotel (Marriott, Hilton, . . . )
6. Airline (United, American, Air China, JPL,.)
7. Price
8. Name
9. Weather
10. Traffic
11. Company
12. Action (buy, sell, reserve, . . . )
13. Award (Best Actor, Best Film, . . . , Best Album, Nobel, Pulitzer, . . . )
14. Year
15. Film
16. Stock Info (quote, P/E, market cap, . . . )
17. Password
18. Website
19. Birthday
20. Theater
21. Store
22. Merchandise
23. Quantity 24. Quality
25. Comparison (best, better, worse, before, after, . . . )
26. Food
27. Highway (280, 101, 85, 237, . . . )
28. Sport (Baseball, Football, Basketball, Hockey, Golf, Tennis, . . . )
29. Score
30. Team
31. Player
32. Rental Car (Hertz, Budget, Avis, . . . )

FIGS. 10A–H illustrate examples of displays in the rectangular window of a hand-held device exemplifying one embodiment of the present invention.

Figure 10A:
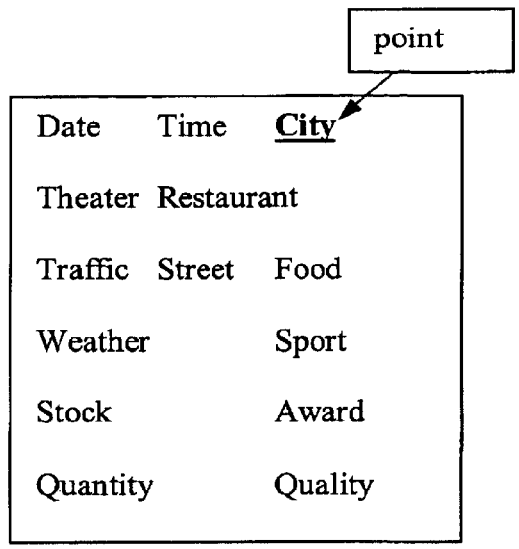

FIG. 10A: the user points at the concept of City with a pointing device.

Figure 10B:
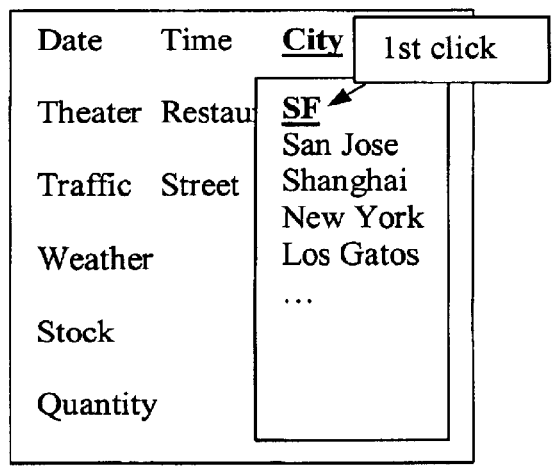

FIG. 10B: the user selects the element, San Francisco by pointing and clicking.

Figure 10C:
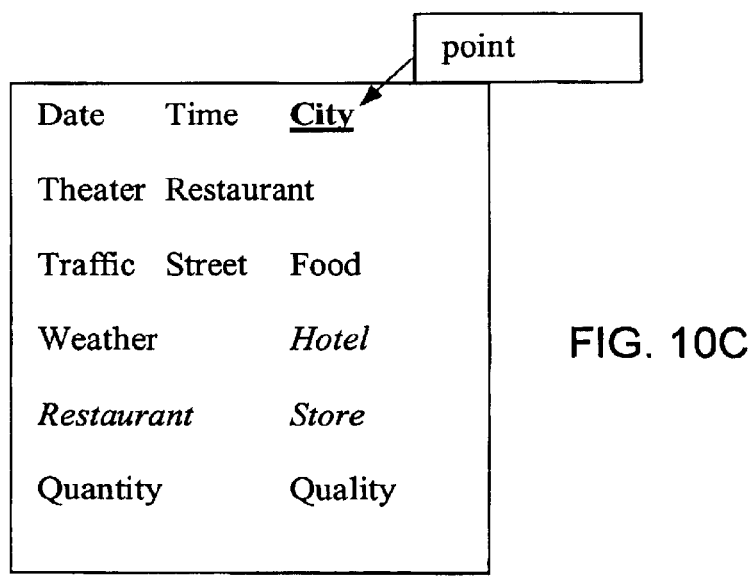

FIG. 10C: the user points at the concept of City again.

FIG. 10D: the user selects the element, New York.

FIG. 10E: the user points at the concept of Date.

FIG. 10F: the user selects December 17.

FIG. 10G: the user points at the concept of Airline.

FIG. 10H: the user selects United.

In one approach, the selection process is through scrolling up and down actions. In another embodiment, the selection process can be through horizontal scanning. In either case, the user selects the concept desired.

After the selection, upon pushing a submit button, the system will return one or more queries for the user to confirm. One of the queries being mapped to is:

What flights are available from San Francisco to New York by United Airline on December 17?

Where the bold faced words represent specific values selected for the concepts of City, City, Airline and Date. Each of them can display a drop-down list when being pointed to by a pointing mechanism, so that different values can be selected based on user preference.

If the user confirms, results will be returned. The system can also elect to return results without the user's confirmation. For example, after the user has selected the two cities, the date and the airline, the system automatically presents to the user a list of flight information.

One implementation of the selector, mapper and generator is described as follows.

To facilitate the selection process for the selector, concepts are grouped into one or more of the following parent groups that may constitute an application scenario:

Travel group={City, Date, Time, Hotel, Airline, Price . . . }
City Information group={City, Weather, Hotel, Restaurant, Date, Time . . . }
Stock group={Stock Info, Company, Quantity, Action, Date, Time . . . }
Award group={Oscar, Tony, Nobel, Year . . . }
Sport group={Sport, Date, Team, Player, Score . . . }

The selector can contain a database with all of the above concepts—the domain of concepts—and their corresponding elements. As an alternative, the elements can be remotely stored in another computer or server. These concepts are logically grouped, apriori or dynamically grouped as explained above. The grouping can facilitate easy selection of related concepts and their elements to formulate a query.

In a first ordering embodiment, concepts are ordered and displayed as follows. Assume in this example that, at any moment, the concepts in the ordered list have a decreasing order of priority, i.e., the first concept in the ordered list has highest priority and the last concept the lowest. The rest of the concepts in the list have decreasing priority.

The default ordered list can be constructed as follows:
Concepts belonging to more groups have more priority;
Concepts belonging to the same number of groups are arranged according to alphabetical order of their names.

In our example, the initial screen may look like FIG. 10A when the selection process starts.

A parent group for a concept is one of the groups that this concept belongs to. Once a concept is selected, all concepts that share a parent group with the selected concept have higher priorities than those that do not. The list of concepts will therefore be reordered. Assume that the list of concepts is represented as {C1, C2, C3, . . . CM, . . . CN), where M represents the number of concepts that can be displayed at the same time. If the order of a concept falls below M, it will not be displayed in the display window and will be replaced by other concepts with higher priorities. For example, as shown in FIG. 10C, Stock and Award concepts are replaced by Restaurant and Store. The FIGS. 10A–10H are used to illustrate the behavior of this process. Actual selection and physical location of concepts on the screen may differ according to individual implementation.

When additional concepts are selected, the above process is applied with the set of selected concepts. The objective of this algorithm is to move the related concepts to the top of the ordered list, i.e., closer to the window of display.

Similarly, elements in a concept can be grouped according to the parent groups of the selected concept. Some elements within a concept apply to some groups but not others. An algorithm similar to the above can be used to make it easier for the user to select applicable elements. When more concepts are selected, the elements can be ordered in the way that will make selection more convenient.

Scrolling can be implemented if the list is longer than the display window. Other input methods can also be injected to make the input easy (e.g., voice). In any case, the selection can be performed one way or other. The principal objective of the input, selecting the concepts and associated elements, can be achieved.

In a second ordering embodiment, concepts can be ordered based on the number of queries they can be mapped to.

C1, C2, C3 can be mapped to FAQ1, FAQ2
C1, C2 can be mapped to FAQ3, FAQ4
C1, C3 can be mapped to FAQ5, FAQ6, FAQ7
C1, C3, C4 can be mapped to FAQ8

In this example, concept 1 can be mapped to 4 queries, concept 2 can be mapped to 2 queries, concept 3 can be mapped to 3 queries, and concept 4 can be mapped to 1 query.

The following order will be established for the concepts:

{C1, C3, C2, C4}

Another way to order the concepts is to mix and match the above two ordering embodiments. For example, concepts can be ordered by the algorithm described in the first ordering embodiment, while the lower level concepts or elements can be ordered by the second ordering embodiment because they are closer to the mapped query.

The ordered list can be scrolled through the display window by the user. It can also scroll automatically and continuously until the user stops it. Selection can be done by point and click with a pointing device, a stylus, a pen or a finger. Selection can also be accomplished by clicking a fixed button when the item to be selected is going by a marker or a window (within the display window). All techniques can be employed to make it easier and faster for the user to select the desired concepts and, if applicable, their corresponding values (elements).

The query interface can operate in a client-server environment. In one embodiment, the selector operates on the client, and the mapper and the generator operate on the server. In another embodiment, the selector and the mapper operate on the client and the generator operates on the server. In still another embodiment, the selector, mapper and generator all operate on the client.

The mapper and generator can function as a table lookup or a database query based on the selected concepts and elements. For example, the selection can be mapped to the following SQL statement template by the mapper:

SELECT flight_no
FROM flight-info
WHERE flight_date=<Date> AND
flight_origin=<City> AND
flight_destination=<City>
airline=<Airline>;

The SQL statement template is mapped because there are three elements selected for the concepts Date, City and City. Additional heuristics can be applied in the selection of the SQL statement based on the concepts selected. The heuristics can be derived from an understanding of the application scenario or past usage. Once the SQL statement template is mapped, the selected elements of the concepts can be substituted accordingly to come up with the SQL statement:

SELECT flight_no
FROM flight-info
WHERE flight_date='Dec. 12, 2000' AND
flight_origin='San Francisco' AND
flight_destination='New York'
airline='United';

For simpler problem domains, table-lookup can yield the same results. For more complex queries, SQL statements may have to be either pre-defined or dynamically generated. One technique to do so can be found in U.S. Pat. No. 5,836,771, entitled "Learning Method and System Based on Questioning," which is hereby incorporated herein by reference.

After the SQL is mapped, the generator executes the SQL query and returns the result in an appropriate format for the output device.

The invention can be implemented with software, hardware, or a combination of hardware and software. The invention can also be embodied as computer readable code on a computer readable medium. The computer readable medium is any data storage device that can store data which can thereafter be read by a computer system. Examples of the computer readable medium include read-only memory, random-access memory, CD-ROMs, magnetic tape, optical data storage devices, carrier waves. The computer readable medium can also be distributed over network coupled computer systems so that the computer readable code is stored and executed in a distributed fashion.

Other embodiments of the invention will be apparent to those skilled in the art from a consideration of this specification or practice of the invention disclosed herein. It is intended that the specification and examples be considered as exemplary only, with the true scope and spirit of the invention being indicated by the following claims.

What is claimed is:

1. A computer-aided method to access information comprising:
    mapping, by a mapper, using one or more rules, to an inquiry based on one or more concepts selected from a group of concepts by a person using a selector; and
    generating, by a generator, a response to the inquiry;
    wherein the response remains the same independent of the order of at least two of the concepts selected by the person.

2. A computer-aided method as recited in claim 1, wherein at least one of the concepts includes elements that are related to each other, and an element can be a concept, and
    wherein the inquiry that is mapped is also based on an element selected.

3. A computer-aided method as recited in claim 1, wherein the group of concepts is a subset of a domain of concepts.

4. A computer-aided method as recited in claim 1, wherein at least two concepts are included in the group of concepts due to at least one of the following reasons: their relationship to each other, previous selection of the two concepts, and at least one characteristic of the person.

5. A computer-aided method as recited in claim 1, wherein the group of concepts is a subset of a domain of concepts, and
    wherein at least one concept is included in the group dynamically based on a concept just selected by the person.

6. A computer-aided method as recited in claim 1, wherein the concepts have an order, and at least the order of one concept changes relative to another concept dynamically based on a concept just selected by the person.

7. A computer-aided method as recited in claim 1, wherein a concept includes more than one related element, and an element is included dynamically in the concept by the selector in view of a concept just selected by the user.

8. A computer-aided method as recited in claim 1, wherein concepts are included in the group to facilitate easy selection of concepts.

9. A computer-aided method as recited in claim 1, wherein the selector is in an Internet appliance.

10. A computer-aided method as recited in claim 1, wherein the selector is in a mobile phone.

11. A computer-aided method as recited in claim 1, wherein the selector is in a television.

12. A computer-aided method as recited in claim 1, wherein the selector is in a personal digital assistant.

13. A computer-aided method as recited in claim 1, wherein the selector includes a screen, and the group of concepts is displayed on the screen.

14. A computer-aided method as recited in claim 1, wherein the selector includes a pointing mechanism to help the person select the concepts.

15. A computer-aided method as recited in claim 1, wherein the selector includes a voice recognizer to help the person select the concepts.

16. A computer-aided method as recited in claim 1, wherein the selector includes a voice synthesizer to indicate to the person at least one concept selected.

17. A computer-aided method as recited in claim 1, wherein more than one inquiry is mapped; and
    wherein the selector allows the person to select one of the inquiries to have a response generated.

18. A computer-aided method as recited in claim 1, wherein the selector allows the person to confirm that the inquiry mapped is correct.

19. A computer-aided method as recited in claim 1, wherein the response is presented to the person in a visual manner.

20. A computer-aided method as recited in claim 1, wherein the selector includes a voice synthesizer, and
wherein the response is presented to the person in an audible manner.

21. A computer-aided method as recited in claim 1, wherein in view of the response, an operation is performed.

22. A computer-aided method as recited in claim 1,
wherein a concept includes more than one related element, and
wherein an element is included dynamically in the concept by the selector in view of a concept just selected by the user.

23. A computer-aided method as recited in claim 1, wherein at least two concepts selected are in different languages.

24. A computing apparatus to access information, comprising:
a selector configured to allow a person to select concepts from a group of concepts,
wherein the selector is coupled to a mapper and a generator, with the mapper configured to use one or more rules to map to an inquiry based on at least two concepts selected by the person, and the generator configured to generate a response to the inquiry, and
wherein the response remains the same independent of the order of at least two of the concepts selected by the person.

25. A computing apparatus as recited in claim 24,
wherein a concept includes a plurality of elements that are related to each other,
wherein an element can be a concept, and
wherein the inquiry that is mapped is also based on an element selected.

26. A computing apparatus as recited in claim 24, wherein the group of concepts is a subset of a domain of concepts.

27. A computing apparatus as recited in claim 24, wherein at least two concepts are included in the group of concepts due to at least one of the following three reasons, namely, their relationship to each other, previous selection of the two concepts by the person, and at least one characteristic of the person.

28. A computing apparatus as recited in claim 24,
wherein the group of concepts is a subset of a domain of concepts, and
wherein at least one concept is included in the group dynamically based on a concept just selected by the person.

29. A computing apparatus as recited in claim 24,
wherein the concepts have an order, and
wherein at least the order of one concept changes relative to another concept dynamically based on a concept just selected by the person.

30. A computing apparatus as recited in claim 24, wherein the selector is in an Internet appliance.

31. A computing apparatus as recited in claim 24, wherein the selector is in a mobile phone.

32. A computing apparatus as recited in claim 24, wherein the selector is in a television.

33. A computing apparatus as recited in claim 24, wherein the selector is in a personal digital assistant.

34. A computing apparatus as recited in claim 24,
wherein the selector includes a screen, and
wherein the group of concepts is displayed on the screen.

35. A computing apparatus as recited in claim 24, wherein the selector includes a pointing mechanism to help the person select the concepts.

36. A computing apparatus as recited in claim 24, wherein the selector includes a voice recognizer to help the person select the concepts.

37. A computing apparatus as recited in claim 24, wherein the selector includes a voice synthesizer to indicate to the person at least one concept selected.

38. A computing apparatus as recited in claim 24,
wherein more than one inquiry is mapped, and
wherein the selector allows the person to select one of the inquiries to have a response generated.

39. A computing apparatus as recited in claim 24, wherein the selector allows the person to confirm that the inquiry mapped is correct.

40. A computing apparatus as recited in claim 24, wherein the response is presented to the person in a visual manner.

41. A computing apparatus as recited in claim 24, wherein the selector includes a voice synthesizer; and
wherein the response is presented to the person in an audible manner.

42. A computing apparatus as recited in claim 24, wherein in view of the response, an operation is performed.

43. A computing apparatus as recited in claim 24, wherein the selector is in a first apparatus which is wirelessly coupled to the mapper and the generator.

44. A computing apparatus as recited in claim 24, wherein at least two concepts selected are in different languages.

45. A computer-aided method to access information comprising:
mapping, by a mapper, using one or more rules, to an inquiry based on a concept selected from a group of concepts by a person using a selector; and
generating, by a generator, a response to the inquiry,
wherein the inquiry includes a plurality of options for the person to select, with each option giving rise to a different response.

46. A computing apparatus to access information comprising:
a selector configured to allow a person to select concepts from a group of concepts,
wherein the selector is coupled to a mapper and a generator, with the mapper configured to use one or more rules to map to an inquiry based on a concept selected by the person, and the generator configured to generate a response to the inquiry, and
wherein the inquiry includes a plurality of options for the person to select, with each option giving rise to a different response.

47. A computer-aided method to access information comprising:
mapping, by a mapper, using one or more rules, to an inquiry based on two or more concepts selected from a group of concepts by a person using a selector; and
generating, by a generator, a response to the inquiry.

48. A method for accessing information on a computing device having a display screen, said method comprising:
displaying a plurality of concepts on the display screen of the computing device;
receiving selections of two or more of the displayed concepts;

mapping the selected two or more of the displayed concepts to an inquiry;

generating a response to the inquiry; and presenting the response on the display screen.

49. A method as recited in claim 48, wherein said mapping operates to map the selected two or more of the displayed concepts to a particular inquiry chosen from a plurality of predetermined inquiries.

50. A method as recited in claim 49, wherein the predetermined inquiries comprise at least one predetermined template for an inquiry.

51. A method as recited in claim 49, wherein the predetermined inquiries comprise at least one determinable portion.

52. A method as recited in claim 51, wherein said method further comprises:

receiving a selection for the at least one determinable portion.

53. A method as recited in claim 48, wherein said mapping is performed using one or more rules.

54. A method as recited in claim 48, wherein said presenting comprises:

displaying a plurality of responses on the display screen; and receiving a selection of one of the responses.

55. A method as recited in claim 48, wherein said method further comprises:

transmitting, following said receiving (c) and before said presenting (d), the selections of two or more of the presented concepts to a remote device via a network, and wherein said receiving (c) operates to receive the response from the remote device via the network.

56. A method as recited in clam 55, wherein the network comprises at least a wireless portion.

57. A method for accessing information on a computing device having a display screen, said method comprising:

displaying a plurality of concepts on the display screen of the computing device;

receiving selections of two or more of the displayed concepts;

receiving a response associated with the selections of the two or more of the displayed concepts; and displaying the response on the display screen.

58. A method as recited in claim 57, wherein the response is further dependent on one or more of: user history, user preference, association, context, and application.

59. A method for accessing information on a computing device, said method comprising:

(a) presenting a plurality of concepts to a user of the computing device;

(b) receiving selections of two or more of the presented concepts;

(c) receiving a response associated with the selections of the two or more of the presented concepts; and (d) presenting the response to the user of the computing device.

60. A method as recited in claim 59, wherein one or both of said presenting (a) and (d) operate to display information on a display screen of the computing device.

61. A method as recited in claim 59, wherein one or both of said presenting (a) and (d) operate to use sound to present information via the computing device.

62. A computer readable medium including at least computer program code for accessing information on a computing device, said computer readable medium comprising:

computer program code for presenting a plurality of concepts to a user of the computing device;

computer program code for receiving selections of two or more of the presented concepts; and computer program code for receiving a response associated with the selections of the two or more of the presented concepts; and computer program code for presenting the response to the user of the computing device.

* * * * *